Figure 1:
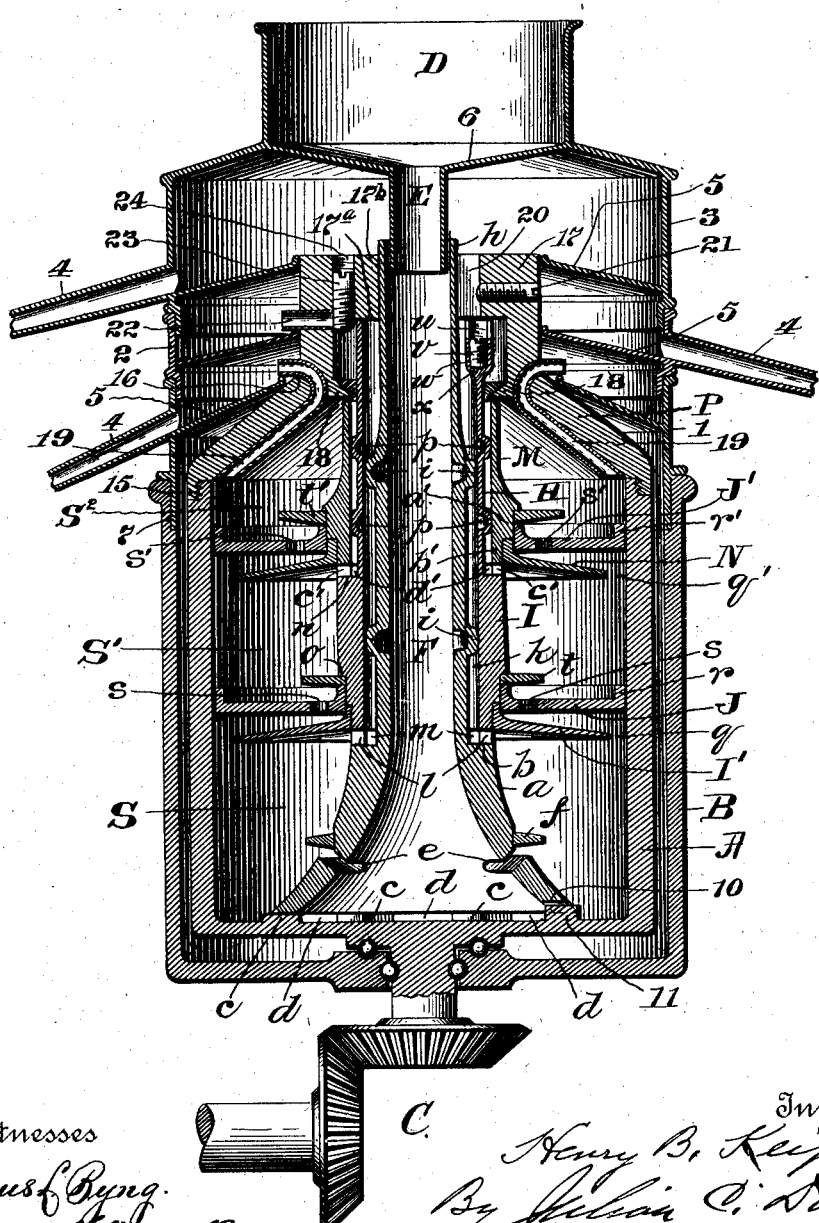

No. 736,976. PATENTED AUG. 25, 1903.
H. B. KEIPER.
CENTRIFUGAL CREAMER.
APPLICATION FILED SEPT. 21, 1900. RENEWED FEB. 4, 1903.
NO MODEL. 4 SHEETS—SHEET 1.

Witnesses
Marcus L. Byng.
[signature]

Inventor
Henry B. Keiper
By Julius C. Dowell
Attorney

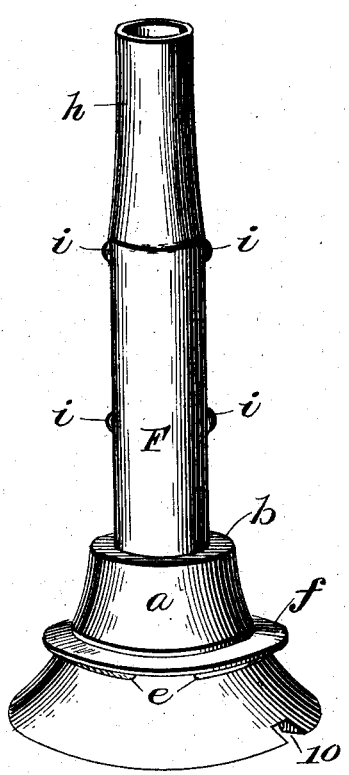
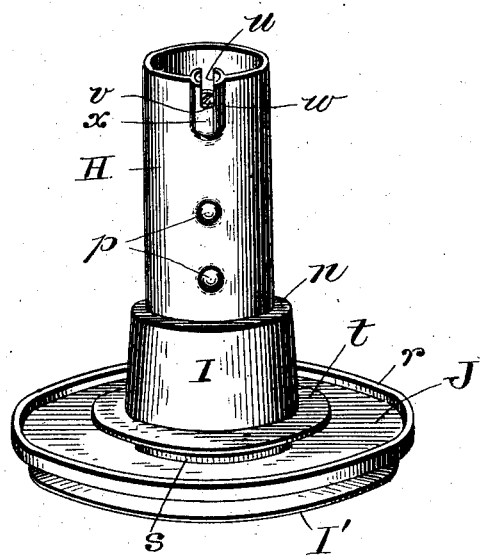
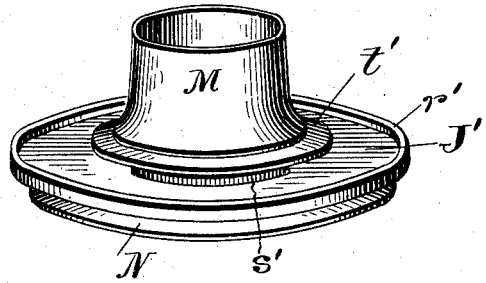

No. 736,976. PATENTED AUG. 25, 1903.
H. B. KEIPER.
CENTRIFUGAL CREAMER.
APPLICATION FILED SEPT. 21, 1900. RENEWED FEB. 4, 1903.
NO MODEL. 4 SHEETS—SHEET 3.
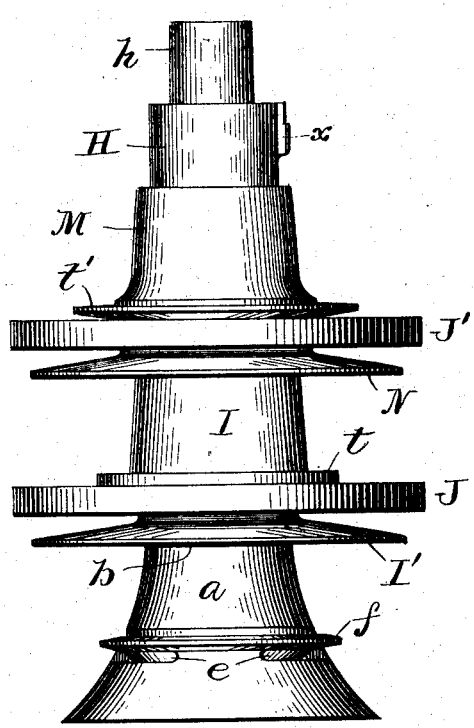
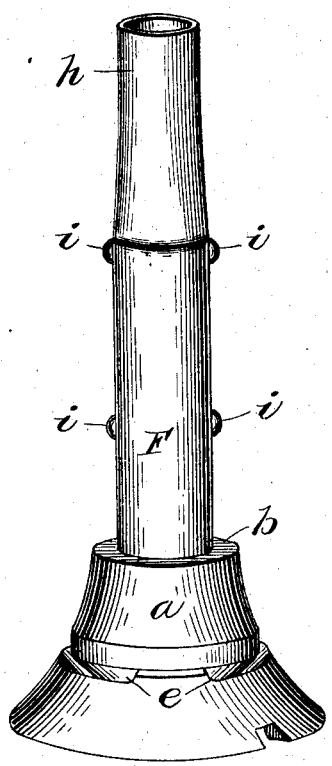
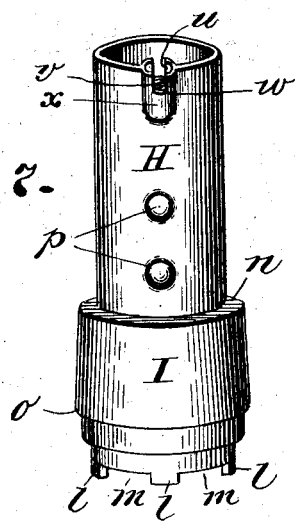
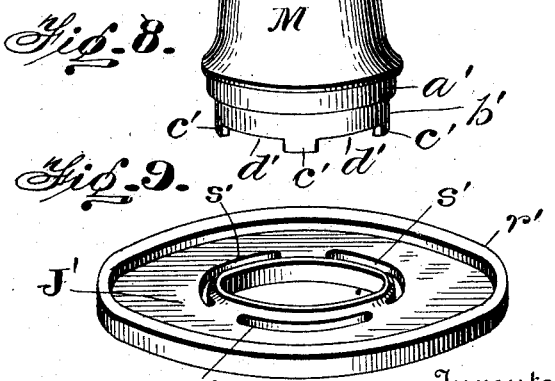
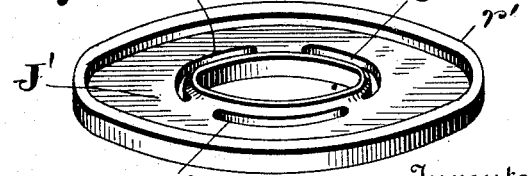

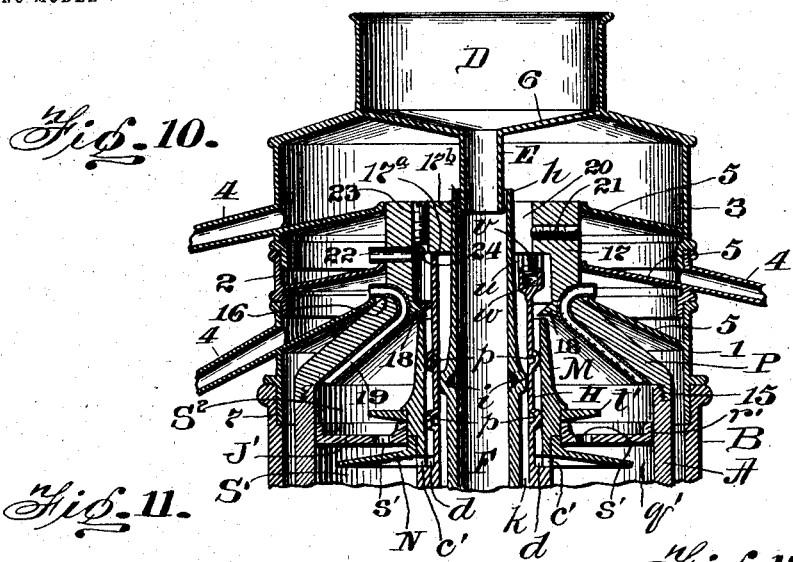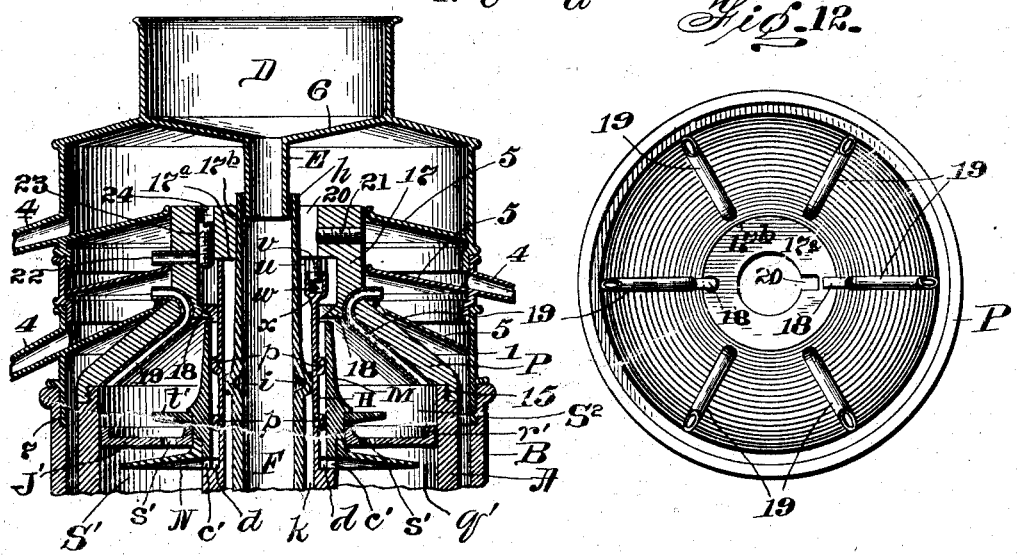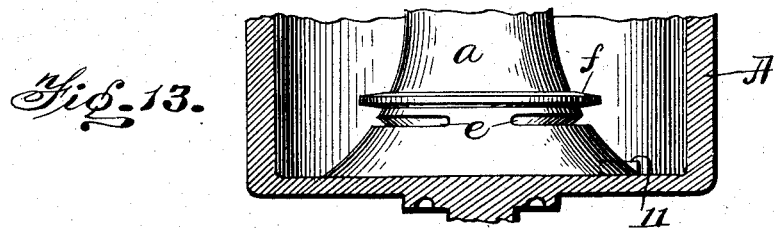

No. 736,976.

Patented August 25, 1903.

UNITED STATES PATENT OFFICE.

HENRY B. KEIPER, OF LANCASTER, PENNSYLVANIA.

CENTRIFUGAL CREAMER.

SPECIFICATION forming part of Letters Patent No. 736,976, dated August 25, 1903.

Application filed September 21, 1900. Renewed February 4, 1903. Serial No. 141,819. (No model.)

*To all whom it may concern:*

Be it known that I, HENRY B. KEIPER, a citizen of the United States, residing at Lancaster, in the county of Lancaster and State of Pennsylvania, have invented certain new and useful Improvements in Centrifugal Creamers; and I do hereby declare the following to be a full, clear, and exact description of the invention, such as will enable others skilled in the art to which it appertains to make and use the same.

This invention relates to centrifugal separators; and it consists, substantially, in the improvements hereinafter described, and particularly pointed out in the claims.

The invention has reference more particularly to that class of centrifugal separators which are employed for separating milk into cream and skimmed milk.

The object of the invention is to provide means for subjecting every particle of fresh milk positively to two or more separate and distinct skimmings successively in the same machine and at one continuous operation and also to provide means for discharging the cream product of said skimmings in one uniform commingled grade of cream and the residue or blue milk in one uniform grade of milk.

A further object is to provide means whereby the cream resulting from the first skimming can be discharged separately from that of subsequent skimmings, thereby yielding or furnishing two or more different grades of cream when desired, and also to provide means whereby the cream of one skimming can be discharged from the machine while that of subsequent or succeeding skimmings is made to discharge and uniformly commingle with the blue milk in the form or nature of skimmed milk, the product being a good merchantable milk.

A still further object of the invention is to provide a centrifugal separator in which the several parts coöperate in the most effectual manner in preventing fresh or whole milk from commingling with skimmed or blue milk during the descent of the former and the gradual ascent of the latter and also to provide means whereby at each skimming or separation the cream is directed into a channel or passage completely separated both from the descending column of fresh milk and the ascending column of skimmed milk.

The above and additional objects I attain by means substantially as illustrated in the accompanying drawings, wherein—

Figure 1 is a vertical sectional elevation of a centrifugal separator constructed and arranged in accordance with my invention, the adjustment of the several valves being such that the cream of the second and third skimmings will pass out with the cream of the first skimming in commingled form or condition. Fig. 2 is a view in perspective of one of the integral sections which constitute a part of the internal structure of the machine, and Fig. 3 is a similar view of another integral section also constituting a part of the internal structure and supported in a removable manner upon the section shown in the preceding figure. Fig. 4 is also a similar view of still another integral section which is mounted or supported in a removable manner upon the second section. Fig. 5 is an elevation showing the three sections of the internal structure of the machine as when put together for use or operation. Fig. 6 is a similar view to Fig. 2 with one of the parts thereof omitted. Fig. 7 is a view in perspective of one of the parts of the removable integral section shown in Fig. 3 to more clearly indicate the construction of this part prior to the joinder or union therewith of the remaining parts which complete said section. Fig. 8 is a similar view of another part of the integral section of Fig. 4 prior to the joinder thereof with the part represented in the preceding figure. Fig. 9 is also a similar view of still another part going to make up the integral section shown in Fig. 4. Fig. 10 is a sectional view in detail and partly broken off at the bottom to show the adjustment of the valves by which the cream of the first skimming or separation and the commingled cream of the second and third skimmings are discharged in separate grades or streams. Fig. 11 is a similar view showing the position or adjustment of the valves by which the cream of the first skimming or separation is discharged separately from the cream of the second and third skimmings while the latter skimmings are commingled with the skimmed milk. Fig. 12 is a bottom plan view of the cap-piece or dome which fits the upper end of the rotary bowl. Fig. 13 is a detail view in part section.

Before proceeding with a more detailed description it may be stated that the machine or apparatus is made up principally of an internal structure comprising two or more separable sections, each of which is composed of several elements preferably united together as an integral whole, so that whenever access is to be had to the interior of the machine or any one of the inner sections thereof but little difficulty will be had either in removing all three of the sections together or one at a time, as occasion may require. The said sections are each so constructed in part that the machine is divided up into two or more separating chambers or compartments in which separate or entirely independent skimmings are effected in a continuous and successive manner. The fresh or whole milk is continuously supplied under its own pressure to the chamber or compartment in which the first skimming or separation is carried on, the bowl of the apparatus meanwhile being rapidly rotated in any suitable manner. The centrifugal force generated causes the skimmed or blue milk to be carried outwardly against the wall of the rotating bowl, while the cream, being the lighter constituent, moves inwardly toward the center or axis of rotation. The cream of this first skimming rises upwardly to a suitable height, at which it overflows into a suitable receptacle, from whence it is discharged into a receiving vessel therefor, and the skimmed or blue milk ascends in an entirely separate column until it reaches the second skimming or separating compartment, where it is subjected to the same action as before. The cream of the second skimming rises in a separate column also to a suitable height, at which it overflows into a receptacle therefor and from which it is discharged in like manner as the cream of the first skimming. Meanwhile the skimmed or blue milk in this compartment ascends as before and passes into the third skimming or separating compartment, in which the action already mentioned is again repeated. The cream of this third skimming also rises in a separate column to a suitable height and is discharged, while the skimmed or blue milk is also emptied into a receptacle therefor, from which it is discharged into a suitable receiver. By the employment of suitable means for the purpose I can at will prevent commingling of the cream resulting from the second and third skimmings; but I prefer in the present instance that a commingling thereof take place at the points of overflow, for the purpose hereinafter more fully understood. It will be particularly noted that none of the fresh or whole milk can in any possible way become mixed either with the ascending column of skimmed or blue milk or with either of the separate rising columns of cream.

The construction and arrangement are such that the cream of all three skimmings can be made to discharge or pass out together in a single grade uniformly mixed or commingled, or the commingled cream of the first and second skimmings can be made to discharge separately from the cream of the first skimming, and so on, thus furnishing two or more separate grades of cream at the same operation. On the other hand, the cream of the first skimming can still continue to be discharged as a separate high grade of cream, while the cream of the second and third skimmings is made to discharge or pass out with the ascending column of skimmed or blue milk, the resultant mixture being marketable and sold by dealers as "skimmed" milk. Accordingly as the cream is to be discharged in one uniformly-commingled grade or in different grades a simple change of adjustment of certain valves is all that is necessary.

Specific reference being made to the accompanying drawings, A represents the bowl of the separator, which is located centrally of the outer stationary casing B and is provided at the bottom with any suitable means C for imparting a rotary motion thereto. Fitted in the open upper end of said stationary casing B is a superposed series of receptacles 1, 2, and 3, hereinafter more specifically referred to, the said receptacles each having an outlet or discharge spout 4 and also having an annular inclined bottom 5, the arrangement being such as to leave concentric openings at the center of the said receptacles. Above the uppermost compartment 3 is a supply-tank D for containing fresh or whole milk, the inclined bottom 6 of which leads to a central outlet E, this construction not differing materially from what has hitherto been employed in some instances, the present invention residing substantially in the devices or structure about to be described.

Located centrally of the bowl A is a tube F, through which the fresh or whole milk is supplied to the separator, the upper end of said tube extending some distance above the bowl and receiving the outlet-pipe E of tank D, which fits therein closely, but without interfering with the rotation of the bowl. The said tube is formed at its lower end with a slightly-tapering enlarged portion $a$ of suitable height, forming an annular ledge $b$, the said enlarged portion terminating in a flaring or conical base G, which rests at its lower edge upon lugs $c$, formed on the bottom of the bowl, suitable intermediate spaces $d$ being left between the edge of the base and the bottom of the bowl, for a purpose hereinafter described. The base is provided also with a number of slots or apertures $e$ around the sides thereof, and directly above said apertures is an annular deflecting-ring $f$. Said base is also provided at its lower edge with a notch 10, which is engaged by a lug or projection 11 on the bottom of the bowl, and thus is the tube F prevented from turning relative to said bowl. It is evident that other means could be employed for this purpose, but the construction shown is simple and effective.

The deflecting-ring is preferably cast or formed integrally with the first removable section of the internal structure, which comprises the tube F and its base; but in some instances the apertures $e$ may not be employed, in which case said ring is made separate from the section and fastened in place upon an annular ledge $g$, provided therefor around the sides of the base.

The thickness of tube F is reduced for a suitable distance from its upper end, as shown at $h$, for a purpose to be described, and said tube is provided on its outer surface with lugs or projections $i$, which are for the purpose of maintaining the approximate concentricity of a shorter intermediate tube H, which surrounds the tube F, as shown. These lugs or projections $i$ may consist of simple protuberances cast on the outer surface of tube F, or if said tube is formed from sheet metal they may be struck up from the body of metal in any suitable way, as shown in Fig. 1, for instance. Said intermediate tube H is shorter but of greater diameter than the tube F, thus leaving an annular space $k$ between the two, and the tube H is provided at its lower end with legs $l$, which rest upon the annular ledge formed by the upper edge of the enlargement $a$ of tube F. Spaces $m$ are thus left between said legs, for a purpose hereinafter more fully understood. The tube H is also provided at its lower part with an annular enlargement I of suitable height and forming an upper annular ledge $n$ and a lower annular flange $o$, and the outer surface of the upper part of said tube is provided with offsets or projections $p$ for maintaining the concentricity of a third tube, hereinafter mentioned. Also provided at the extreme lower end of said tube H is an annular disk I', which is preferably slightly concave on its under surface and slightly convex on its upper surface, said disk being less in diameter than the inner diameter of the bowl A, leaving a space $q$ between. Above the said disk I' is an annular division-plate or partition J, which surrounds the lower part of tube H and is of equal diameter with the inner diameter of said bowl. The outer edge of said plate or partition J is flanged all around at $r$ and fits the bowl closely, while openings or passages $s$ are formed therein close to the inner edge. Located just above the division-plate or partition is an annular deflecting-ring $t$, which when the parts are formed separately abuts flange $o$ of the enlargement I and the outer edge or perimeter of which extends somewhat beyond the outer edges of the said passages $s$. At the upper end of said intermediate tube H is formed a port or passage $u$, for a purpose hereinafter described, said port being provided with a suitable valve $v$ for opening and closing the same, and which valve in the present instance consists of a simple screw working in a seat $w$ formed by a thickened portion $x$ in the wall of said tube H. Surrounding the said intermediate tube H is a still shorter outer tube M, which is preferably slightly conical on its outer surface and is formed near its lower end with flanges $a'$ and $b'$. Said outer tube and its appurtenances are preferably all cast integrally, as shown in Fig. 4; but when the several parts thereof are made separately and afterward united then the tube is provided at its lower end with legs $c'$, which rest upon ledge $n$ of intermediate tube H, leaving intermediate spaces $d'$, for a purpose described hereinafter. This tube, similarly as the tube H, is provided at its lower end with a disk N, which is preferably slightly concave on its under surface and slightly convex on its upper surface, the diameter of said disk being also less than the inner diameter of the bowl A, leaving a space $q'$ between the edge of the disk and the wall of the bowl. Above said disk N is a second annular division-plate or partition J', which surrounds the outer tube M and abuts flange $b'$ thereof and which is also of equal diameter with the inner diameter of the bowl and is flanged all around at $r'$. Said partition also closely fits the bowl similarly as the plate or partition J below the same, and it is likewise formed with openings or passages $s'$ nearer the inner edge thereof. Located above these openings or passages is a deflecting-ring $t'$, which surrounds the tube M, abutting flange $a'$ thereof, and which extends somewhat beyond the outer edges of said openings or passages.

The parts of each of the sections of the internal structure as thus constructed are all united integrally, and in practical use the said structure presents the appearance represented in Fig. 5. In virtue of the fastening between the bowl A and the base G of the central or whole-milk tube F the said bowl also becomes practically an integral part, and it will thus be seen how all the parts rotate together. Surmounting the said internal structure and screwing into the bowl A at 15 is a cap-piece or dome P, the wall or sides of which converge from the lower edge thereof to a point 16, whence for the remainder of its height the said dome is upstanding or vertical, as at 17, and surrounding which part are the receptacles 1 2 3. Interiorly this cap-piece or dome is hollowed out to conform to the general shape thereof just described, the upstanding or vertical portion 17 being provided with an inner annular abutment $17^a$ for the upper end of the intermediate tube H and a central opening $17^b$ for the passage of the central tube F, while at a point lower down small blocks 18 are employed as abutments for the upper end of outer tube M, said blocks also serving as partial rests or supports for the cap-piece. Arranged on the under side of the cap-piece in substantially radial directions is a number or series of upwardly-inclined outlet-pipes 19, the upper ends of which lead to the skimmed-milk receptacle $i$ through suitable openings in the sides of the cap-piece, while the lower ends thereof reach to the lower edge of said cap-piece at the inner surface of the wall of the bowl A.

The upstanding or vertical part 17 of the cap-piece or dome is provided with a vertical outlet-port 20, which leads to the receptacle 3, the said port being opened and closed at will by means of any suitable valve 21, which in the present instance is a simple screw-valve working in an opening formed in the side of the cap-piece. Also formed in the side of said vertical part 17 of the cap-piece is a horizontal port 22, leading to the receptacle 2, and said port is also opened and closed at will by means of a similar screw-valve 23, working in a vertical opening 24, formed in the said cap-piece or dome.

It will be seen that as mounted and located within the bowl A the division-plates J and J' form or constitute with said bowl three separate and distinct separating compartments or chambers, (designated at S, S', and $S^2$, respectively.) The lowermost chamber S is the one to which the first or whole milk is introduced and in which the first skimming or separation takes place. The second or intermediate chamber S' is the one in which the second skimming takes place, while the third or final skimming is effected in the third or uppermost chamber or compartment $S^2$.

The deflecting-plate $f$ serves to prevent fresh milk flowing out through openings $e$ from gushing or spurting upwardly and mixing with the cream of the first skimming as it climbs the sides of the lower enlarged portion of pipe F. The spaces $d$ beneath the base G and the apertures $e$ in the side of said base may both be used together or either may be used alone, according to the particular requirements or exigencies of the case. In like manner the deflecting-rings $t$ and $t'$ serve to prevent the ascending skimmed or blue milk from becoming mixed with the cream of the second and third skimmings, respectively.

By reducing the thickness of the upper part of the pipe F, as shown at $h$, a greater or increased space or passage is formed between said tube and the next or intermediate tube H the better to accommodate the increased volume caused by the commingling of all the grades of cream when the port $u$ is left open.

The apparatus being constructed and arranged substantially as herein shown and described, the operation is as follows: The fresh or whole milk flows from the tank D into the central or whole-milk tube F and passes down the latter and escapes into the lowermost separating chamber or compartment of the bowl A either through the spaces $d$ beneath bar G or through the slots or apertures $e$ around the sides of the base and is immediately subjected to the action of the centrifugal force generated by a rapid rotation of the bowl. The skimmed or blue milk being the heavier constituent, is thrown outwardly against the wall of the bowl, while the cream being the lighter constituent is caused to flow toward the center of the apparatus. The skimmed or blue milk being thus obstructed is compelled to move upwardly, though still having an outward tendency, and as it reaches or comes into contact with the under side of the division-plate J between the first and second skimming or separating chambers S and S' it is again obstructed and is again compelled to seek the center of the machine, (passing between disk I' and said plate J,) where it escapes upwardly through the openings or passages $s$ in the division-plate J and passes from the first separating-chamber into the second separating-chamber. As the skimmed or blue milk is thus continuously ascending, the action of the disk I' is to spread the same outwardly, and thus prevent any admixture thereof with the cream, which in the meantime is climbing upwardly all around the sides of base G, thence through the spaces $m$ between legs $l$ of tube H, whence it rises in one continuous column around the sides of tube F, and finally passes out through outlet-port 20 in the cap-piece or dome and overflows into receptacle 3 for the same. Although the operation is carried on continuously, it may now be said that the first skimming or separation has been completed and that the second is about to commence. On passing from the first separating chamber or compartment into the second the blue milk of the first skimming is again subjected to precisely the same operation, and moving upwardly, as before, it is compelled to again seek the center, (this time passing between disk N and division-plate J',) where it escapes through passages $s'$ in said division-plate J', and thus enters the third separating-chamber. Meanwhile the cream resulting from the second separation is in like manner caused to move inwardly, and as it reaches the enlargement I it climbs the sides thereof, passing through spaces $d'$, thence upwardly in one continuous column around the sides of the intermediate tube H. If the port $u$ at the upper end of said tube is now open, this cream will pass through the same and out with the cream of the first skimming; but if said port be closed said cream will commingle with the cream of the third separation, about to be described, and pass out therewith through port 22. In the upper or third separating chamber or compartment $S^2$ the skimmed or blue milk is still again subjected to the same action as before and on moving upwardly escapes through the outlet-pipes 19 on the under side of the cap-piece or dome P and is delivered in an obvious manner to receptacle 1. Meanwhile the cream of the third skimming or separation climbs the sides of outer tube M and is preferably allowed to commingle with the cream of the second skimming or separation and to pass out with the same through port 22 into receptacle 2. It will thus be seen that the whole milk has been continuously subjected to three separate and distinct skimmings and that there is no possibility of any fresh and skimmed milk becoming mixed with each other or with either of the rising columns of cream except as hereinafter mentioned. It will further be seen that the cream of the several columns cannot mix with each other also except in the manner hereinafter understood. Now to obtain one uniform commingled grade of cream comprising the resultant of three or more separate skimmings it is simply necessary to open ports 20 and $u$, as shown in Fig. 1, and close the port 22, whereupon the cream of all the skimmings will pass out of port 20 and be discharged. To obtain two separate grades of cream, the port 20 is kept open for the outlet and discharge of the cream of the first skimming, while the port $u$ is closed and port 22 opened. (See sectional view, Fig. 7.) Thus the first skimming passes out as one grade and the commingled second and third skimmings pass out as another grade. To obtain a high grade of cream and a high grade of skimmed "merchantable" milk, the port 20 is still kept open, but both port $u$ and port 22 are closed, which results in the first skimming still passing out as before, while the commingled cream of the second and third skimmings, having no other outlet, is compelled to pass out with the skimmed milk.

The bowl A may be constructed in any suitable way and of any suitable material; but preferably the same is struck up from sheet metal. The parts of each of the inner sections, as before stated, may be either cast as an integral whole, or if made from sheet metal each part of each section is struck up separately and the parts afterward united or rigidly joined together. Instead of sheet metal I may use phosphor-bronze in the manufacture of the several parts.

It will be observed that at each successive operation or skimming the skimmed or blue milk is absolutely compelled to seek the center of the machine, due to the construction of the parts, and it is in virtue of this action that the separation or skimming is actually effected. It will also be understood that if only a single high grade of cream is desired, together with a high-grade merchantable milk, the same can be obtained by simply taking out or removing the upper section of the internal structure, whereupon the whole milk will be subjected to but one skimming, as is evident. Moreover, it will be understood that the number of skimming or separating compartments can be increased indefinitely, so that the skimming or separation of the milk can be effected as many times over as may be desired. In this latter case, of course, the number of division-plates or partitions will have to be increased accordingly.

Having thus fully described my invention, what I claim as new, and desire to secure by Letters Patent of the United States, is—

1. A centrifugal creamer comprising means for successively skimming the milk, means for maintaining the cream of the several skimmings apart from each other and from the milk, and means for discharging the same in different grades.

2. A centrifugal creamer comprising means for successively skimming the milk, means for separating the cream of the several skimmings, means for running off one or more of said skimmings independently, and means for running off other of the said skimmings with the skimmed milk.

3. A centrifugal creamer comprising means for successively skimming the milk, means for separating the cream of the several skimmings, and means for running off at will the resultant of all the skimmings in one commingled stream or in separate streams.

4. A centrifugal creamer comprising independent separating-chambers, means forming escape-passages for the cream from said chambers, each having an outlet-port, and valves for controlling said ports at will.

5. A centrifugal creamer comprising a rotatable bowl, plates dividing the same into independent separating-chambers, and having passages for the blue milk, means forming an independent cream-outlet for each chamber, and means for controlling said outlets at will.

6. A centrifugal creamer comprising a rotatable bowl, plates dividing the same into independent separating-chambers, and having passages for the blue milk, means forming an independent outlet for each chamber, with means for controlling the same, means for deflecting the blue milk as it rises through the passages, and means for positively directing the milk toward the center for its passage upward.

7. A centrifugal creamer comprising a rotatable bowl constructed of two or more independent separating-chambers, means leading to the first chamber for conveying the fresh milk thereto, means forming a cream-outlet for said chamber and means for controlling the same, and means forming independent outlets for the other chambers also having controlling devices.

8. A centrifugal creamer comprising a rotatable bowl, plates dividing the same into independent separating-chambers, a central fresh-milk tube resting on the bottom of the bowl, and having outlets for the milk leading to the first or lowermost chamber only, said tube extending above the bowl at its upper end, an intermediate tube of larger diameter inclosing a part of said outer tube and forming therewith a passage for the skimmings of the first chamber, said tube having a valve-controlled port at its upper end, a third tube of still larger diameter inclosing a part of the second-named tube and forming therewith a passage for skimmings of the second chamber, the dome surmounting the machine and receiving the upper end of the center tube, and also provided with valve-controlled ports and the outlet-pipes for the skimmed milk.

In testimony whereof I affix my signature in presence of two witnesses.

HENRY B. KEIPER.

Witnesses:
M. G. SWAN,
WALTER A. MILLER.